United States Patent
Kikuta

(10) Patent No.: US 10,484,601 B2
(45) Date of Patent: Nov. 19, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kyohei Kikuta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 15/249,058

(22) Filed: Aug. 26, 2016

(65) Prior Publication Data
US 2017/0064203 A1    Mar. 2, 2017

(30) Foreign Application Priority Data

Aug. 31, 2015 (JP) .................. 2015-171255
Jul. 12, 2016 (JP) .................. 2016-137644

(51) Int. Cl.
| | |
|---|---|
| *H04N 5/232* | (2006.01) |
| *H04N 1/00* | (2006.01) |
| *H04N 5/247* | (2006.01) |
| *H04N 5/262* | (2006.01) |
| *G06T 3/40* | (2006.01) |

(52) U.S. Cl.
CPC ....... *H04N 5/23238* (2013.01); *G06T 3/4038* (2013.01); *H04N 1/00* (2013.01); *H04N 5/247* (2013.01); *H04N 5/2624* (2013.01)

(58) Field of Classification Search
CPC ........ G09G 5/00; H04N 5/23238; H04N 1/00; H04N 5/247; H04N 5/2624; H04N 1/387; H04N 5/225; G06K 9/4604; G06K 9/52; G06K 9/6215; G06K 2009/4666; G06K 9/48; G06T 7/0042; G06T 7/0081; G06T 7/0083; G06T 7/60; G06T 1/00; G06T 3/00
See application file for complete search history.

(56) References Cited

U.S. PATENT DOCUMENTS

| | | | |
|---|---|---|---|
| 5,187,754 A * | 2/1993 | Currin | G06K 9/0063 375/E7.086 |
| 6,075,905 A * | 6/2000 | Herman | G06K 9/32 348/588 |

(Continued)

FOREIGN PATENT DOCUMENTS

JP    2011-193062 A    9/2011

*Primary Examiner* — Dramos Kalapodas
(74) *Attorney, Agent, or Firm* — Canon U.S.A., Inc. IP Division

(57) ABSTRACT

An image processing apparatus according to the present disclosure includes an acquisition unit configured to acquire a position for identifying a region in which a plurality of images are combined in an overlap region, the plurality of images being obtained in a partially-overlapping manner, a detection unit configured to detect an edge in vicinity of the position for identifying the region in the plurality of images, and a combining unit configured to combine the plurality of images to generate an output image by blending pixel values of pixels constituting the plurality of images, in vicinity of the position for identifying the region, wherein the combining unit sets a parameter for controlling the region in which the plurality of images are combined, according to a correlation between the position for identifying the region and the edge.

16 Claims, 14 Drawing Sheets

(56) References Cited

U.S. PATENT DOCUMENTS

| | | | | |
|---|---|---|---|---|
| 6,486,908 | B1 * | 11/2002 | Chen | G06T 3/0018 345/441 |
| 7,006,709 | B2 * | 2/2006 | Kang | G06K 9/32 345/422 |
| 2009/0263023 | A1 * | 10/2009 | Iwamoto | H04N 5/147 382/199 |
| 2010/0020097 | A1 * | 1/2010 | Mai | G06T 3/4038 345/629 |
| 2010/0097443 | A1 * | 4/2010 | Lablans | G03B 37/00 348/36 |
| 2012/0293610 | A1 * | 11/2012 | Doepke | H04N 5/23238 348/36 |
| 2012/0294549 | A1 * | 11/2012 | Doepke | G06T 3/4038 382/294 |
| 2012/0307000 | A1 * | 12/2012 | Doepke | G06T 3/0068 348/36 |
| 2015/0131924 | A1 * | 5/2015 | He | G06T 3/0018 382/284 |
| 2016/0247017 | A1 * | 8/2016 | Sareen | G06T 19/00 |
| 2018/0039852 | A1 * | 2/2018 | Nakamura | G06T 7/194 |

* cited by examiner

FIG. 9
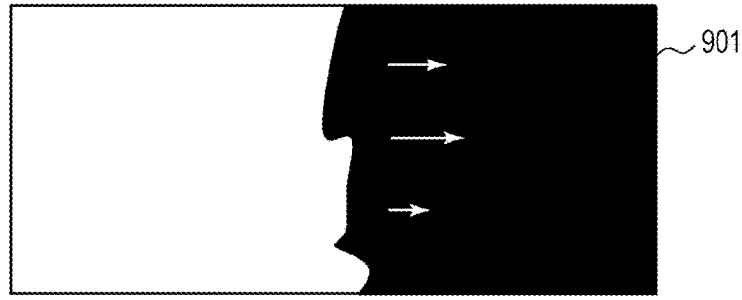
MAP M1 INDICATING RANGE IN WHICH CORRECTED IMAGE 1 IS USED — 901
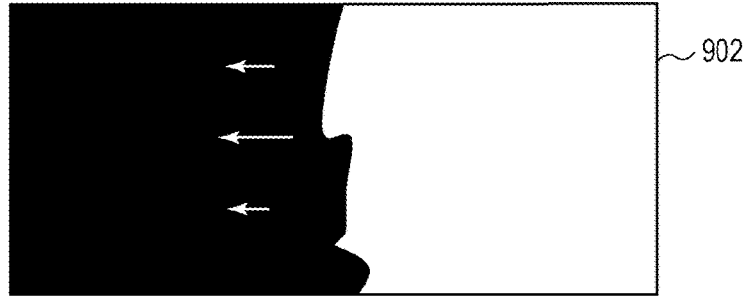
MAP M2 INDICATING RANGE IN WHICH CORRECTED IMAGE 2 IS USED — 902

FIG. 10

COMBINING LINE

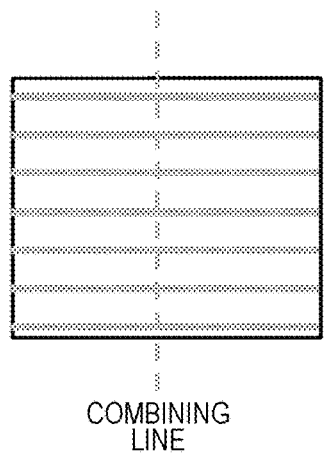
FIG. 17A
COMBINING LINE
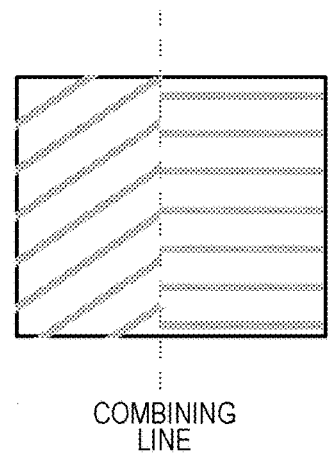
FIG. 17B
COMBINING LINE
FIG. 18
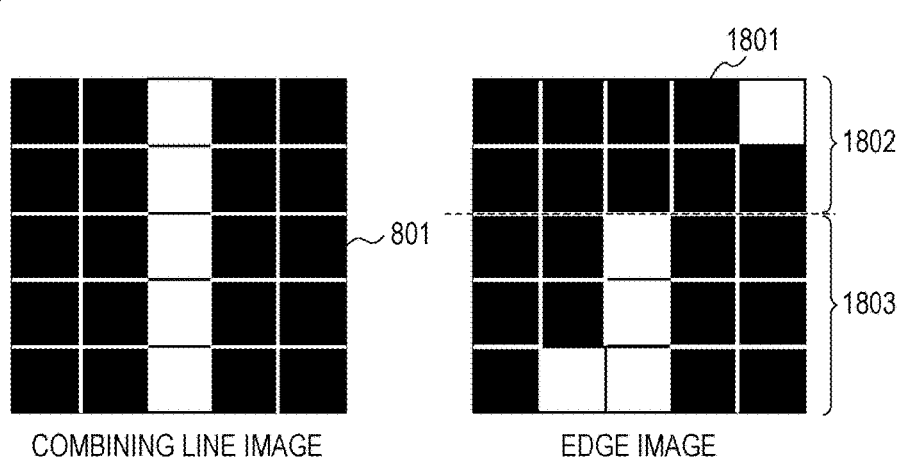
COMBINING LINE IMAGE
EDGE IMAGE

IMAGE PROCESSING APPARATUS, IMAGE PROCESSING METHOD, AND STORAGE MEDIUM

BACKGROUND OF THE INVENTION

Field of the Invention

The present invention relates to processing for generating a wide viewing angle (panoramic) image by combining a plurality of partially overlapping images.

Description of the Related Art

In the case of generating 1 wide viewing angle (panoramic) image by combining a plurality of images captured in a partially-overlapping manner so as to include the same subject, it is necessary to smoothly connect the images at the boundary portion. Thus, in the overlap region of at least 2 adjacent images, the images are combined by blending (weighted-adding) pixel values of corresponding pixels. Japanese Patent Laid-Open No. 2011-193062 discloses a method for combining images in the following manner. First, in the overlap region of adjacent images, the amount of movement between 2 images is calculated for each block. Then, pixel values of pixels in each block of the 2 images are weighted-added using a weighted ratio set according to the movement amount. As for pixels with a large amount of movement between the images, a positional difference is easily generated. Thus, pixel values of the pixels in the 2 images are weighted-added while applying a larger weight on the pixel values of one image. In contrast, as for pixels with a small amount of movement between the images, pixel values of the pixels in the 2 images are weighted-added while applying a weight of 0.5 on the pixel values of both images.

Nevertheless, in the method disclosed in Japanese Patent Laid-Open No. 2011-193062, if a positional difference is generated between 2 images in the overlap region, the weighted-addition of pixel values of corresponding pixels generates a multiple overlapping image and deteriorates sharpness in an edge portion. On the other hand, in a flat portion in the overlap region, the switching of a weight for performing weighted-addition generates an artifact in some cases. For example, a color discontinuously changes on a boundary line.

SUMMARY OF THE INVENTION

Embodiments of the present invention combine a plurality of images more naturally by weighted-adding pixel values in the overlap region according to an image feature. For solving the above-described issue, an image processing apparatus according to embodiments of the present invention includes an acquisition unit configured to acquire a position for identifying a region in which a plurality of images are combined in an overlap region, the plurality of images being obtained in a partially-overlapping manner, a detection unit configured to detect an edge in vicinity of the position for identifying the region in the plurality of images, and a combining unit configured to combine the plurality of images to generate an output image by blending pixel values of pixels constituting the plurality of images, in vicinity of the position for identifying the region, wherein the combining unit sets a parameter for controlling the region in which the plurality of images are combined, according to a correlation between the position for identifying the region and the edge.

Further features of the present invention will become apparent from the following description of exemplary embodiments (with reference to the attached drawings).

BRIEF DESCRIPTION OF THE DRAWINGS

FIG. 9 is a diagram illustrating ranges in which corrected images are used in an output image.

FIG. 10 illustrates a table indicating results obtained when processing is performed while varying a position of a combining line and a blend width.

FIGS. 17A and 17B are diagrams illustrating an example case in which feature amounts of small regions are different according to the second exemplary embodiment.

FIG. 18 is a diagram illustrating examples of combining line vicinity regions of a combining line image and an edge image.

DESCRIPTION OF THE EMBODIMENTS

Figure 1:
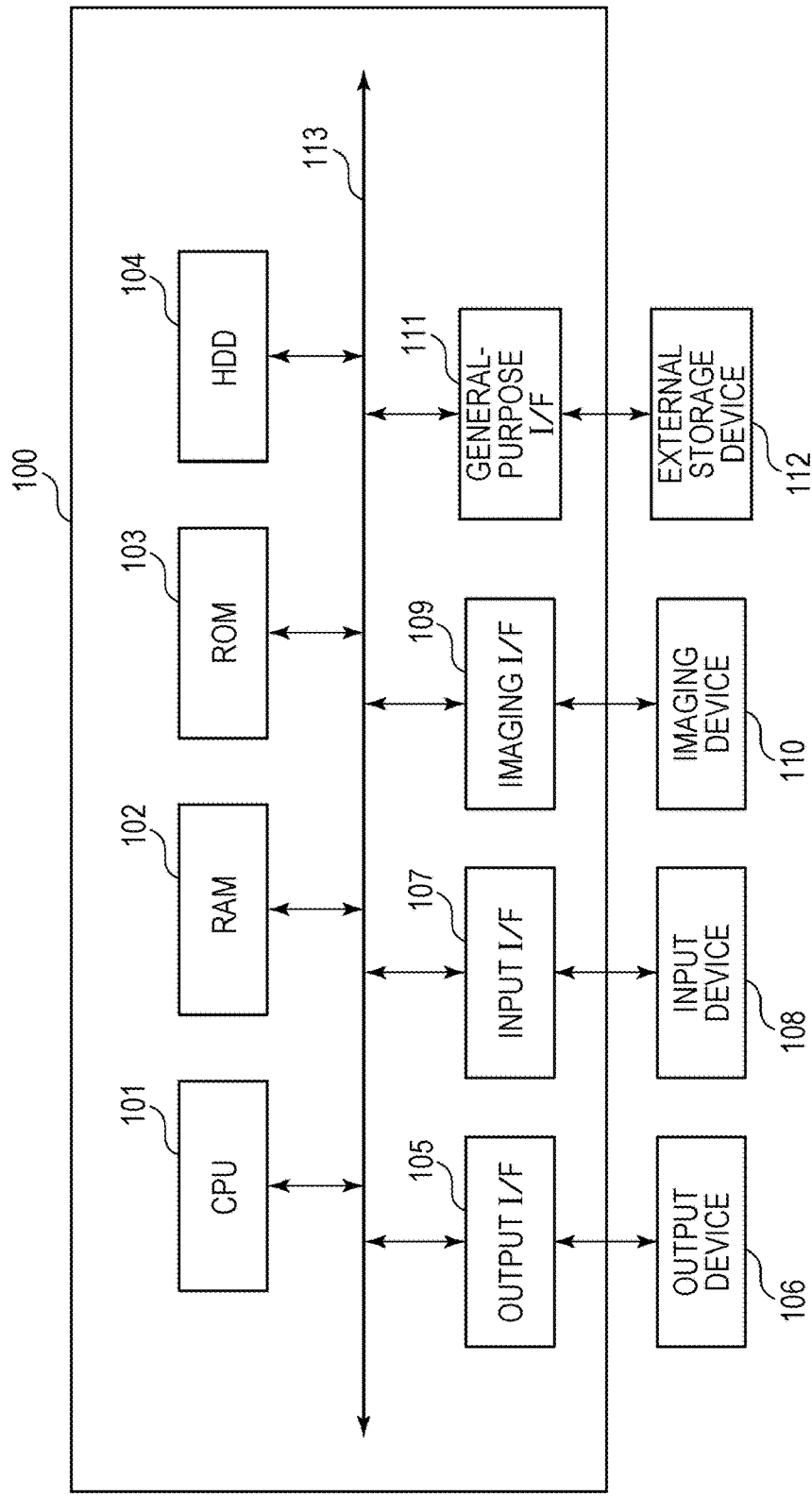
FIG. 1 is a schematic diagram illustrating a hardware configuration of an image processing apparatus.

The present disclosure will be described in detail below according to preferred exemplary embodiments, with reference to the attached drawings. In addition, configurations described in the following exemplary embodiments are mere examples, and the present disclosure is not limited to the configurations illustrated in the drawings.

<First Exemplary Embodiment>

FIG. 1 is a diagram illustrating a hardware configuration of an image processing apparatus applicable to the present exemplary embodiment. An image processing apparatus 100 includes a central processing unit (CPU) 101, a random access memory (RAM) 102, a read-only memory (ROM)

103, and a hard disk drive (HDD) 104. The image processing apparatus 100 further includes an output interface (I/F) 105, an input interface (I/F) 107, an imaging interface (I/F) 109, a general-purpose interface (I/F) 111, and a general-purpose system bus 113. The CPU 101 is a processor for comprehensively controlling each unit in the image processing apparatus 100. The RAM 102 functions as a main memory, a work area, and the like of the CPU 101. The ROM 103 stores a group of programs executed by the CPU 101. The HDD 104 stores an application executed by the CPU 101, data used in image processing, and the like. The output I/F 105 is an image output interface such as a digital visual interface (DVI) and a high-definition multimedia interface (HDMI) (registered trademark), for example, and connects an output device 106 such as a liquid crystal display. The input I/F 107 is a serial bus interface such as a universal serial bus (USB) and the IEEE1394, for example, and connects an input device 108 such as a keyboard and a mouse for a user issuing various instruction operations. The imaging I/F 109 is an image input interface such as the third generation (3G)/high definition serial digital interface (HD-SDI) and the HDMI (registered trademark), for example, and connects an imaging device (a camera) 110 for obtaining digital image data by capturing an image. Similarly to the input I/F 107, the general-purpose I/F 111 is a serial bus interface such as a USB and the IEEE1394, and connects an external storage device 112 as necessary.

In the present exemplary embodiment, the following configuration will be described as an example. More specifically, the image processing apparatus 100 externally connects to the imaging device 110 to receive a plurality of digital image data obtained by the imaging device 110 through image capturing, and generates a panoramic image by performing various types of image processing on the image data. In addition, the panoramic image is a large image generated by connecting a plurality of images, and is an image equivalent to an image obtainable when shooting is performed with a wider viewing angle than a lens-specific viewing angle. In the present exemplary embodiment, the description will be given of a method of generating an image large in a horizontal direction by connecting 2 image data from side to side. In this example, 2 imaging devices 110 each shoot a predetermined subject. The image processing apparatus 100 is implemented by a personal computer, for example. Alternatively, the image processing apparatus 100 can be implemented as a circuit dedicated for image processing that is built in a digital camera or a camera-equipped information terminal.

Figure 2:
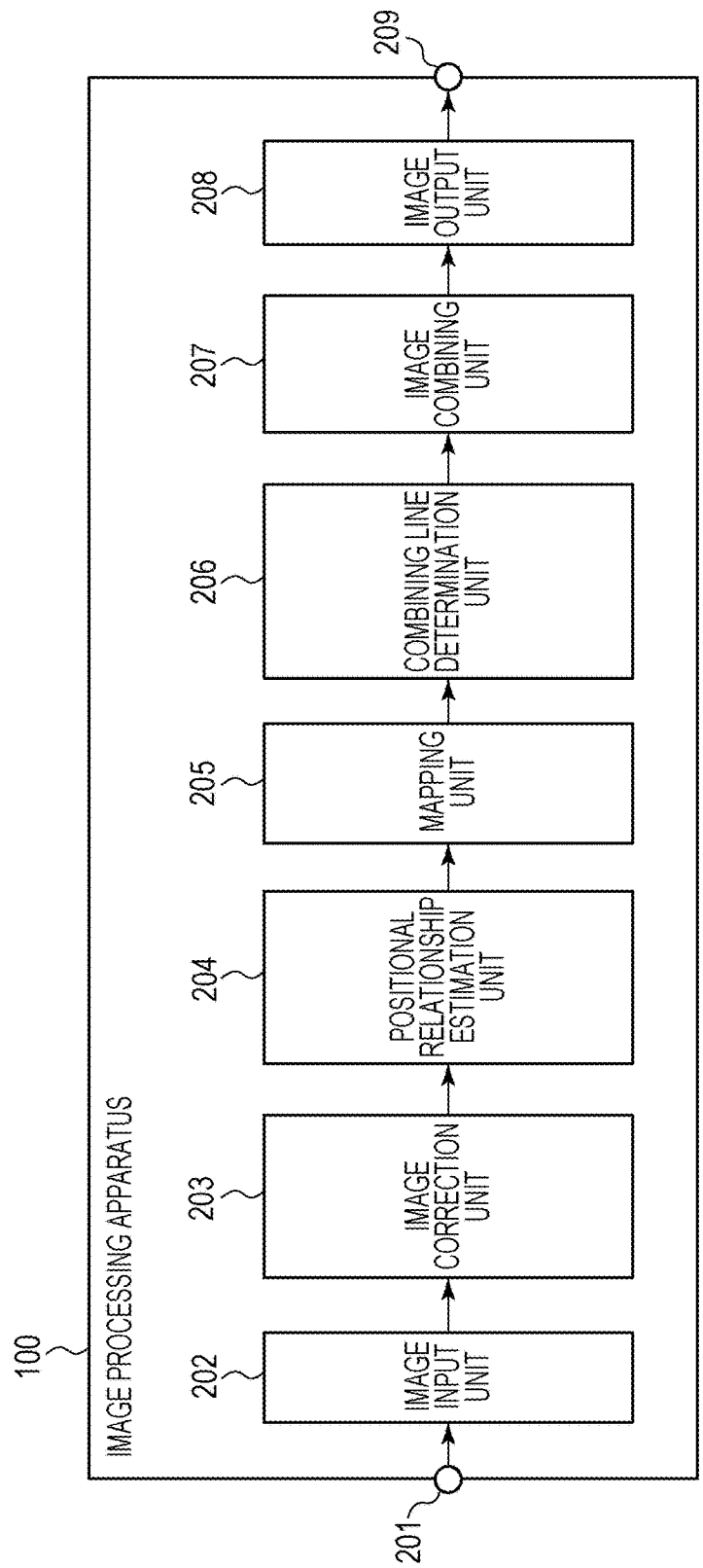
FIG. 2 is a block diagram illustrating a functional configuration of the image processing apparatus.

FIG. 2 is a block diagram illustrating a functional configuration of the image processing apparatus 100 according to the present exemplary embodiment. By reading out a program stored in the ROM 103 or the HDD 104 and executing the program using the RAM 102 as a work area, the CPU 101 serves a function as each functional block illustrated in FIG. 2. In addition, the CPU 101 need not serve the functions of all the functional blocks, and a processing circuit dedicated for each functional block may be provided. The image processing apparatus 100 includes an image input unit 202, an image correction unit 203, a positional relationship estimation unit 204, a mapping unit 205, a combining line determination unit 206, an image combining unit 207, an image output unit 208, an input terminal 201, and an output terminal 209. The image input unit 202 inputs a plurality of images for generating a panoramic image. The plurality of images is obtained by performing image capturing in a partially-overlapping manner.

The image correction unit 203 performs various types of correction processing on each image. In this example, the image correction unit 203 corrects optical strain caused by a lens. The positional relationship estimation unit 204 estimates a relative positional relationship between cameras corresponding to input images by associating feature points in the images. The positions of the cameras are estimated for mapping the images in the same coordinate system. Thus, if the positional relationship between the cameras is identified in advance, or the positions in a space that are projected in the respective images are identified, the positional relationship estimation unit 204 is not necessary.

The mapping unit 205 maps the images in the same coordinate system for combining the plurality of images obtained by performing image capturing in a partially-overlapping manner. The combining line determination unit 206 determines a combining line serving as a boundary for combining the plurality of images captured in a partially-overlapping manner. The combining line determination unit 206 identifies an overlap region of the images mapped by the mapping unit 205, and sets a combining line in the overlap region. In the present exemplary embodiment, in a combining line vicinity region, pixel values of corresponding pixels in the plurality of images having the overlapping region are blended. It can be therefore said that the combining line determination unit 206 determines a position serving as a reference of a region in which pixel values of pixels corresponding to the plurality of images are blended.

The image combining unit 207 generates an image by combining the images based on the combining line and blending pixel values of the pixels in the plurality of corresponding images in the vicinity of the combining line serving as a boundary. An output image obtained at this time is an image known as a panoramic image, and is an image with a wider viewing angle than that in the case of performing shooting with a viewing angle of a normal camera, as described above. The image output unit 208 outputs, to the outside, the output image obtained as a result of the combining performed by the image combining unit 207.

Figure 3:
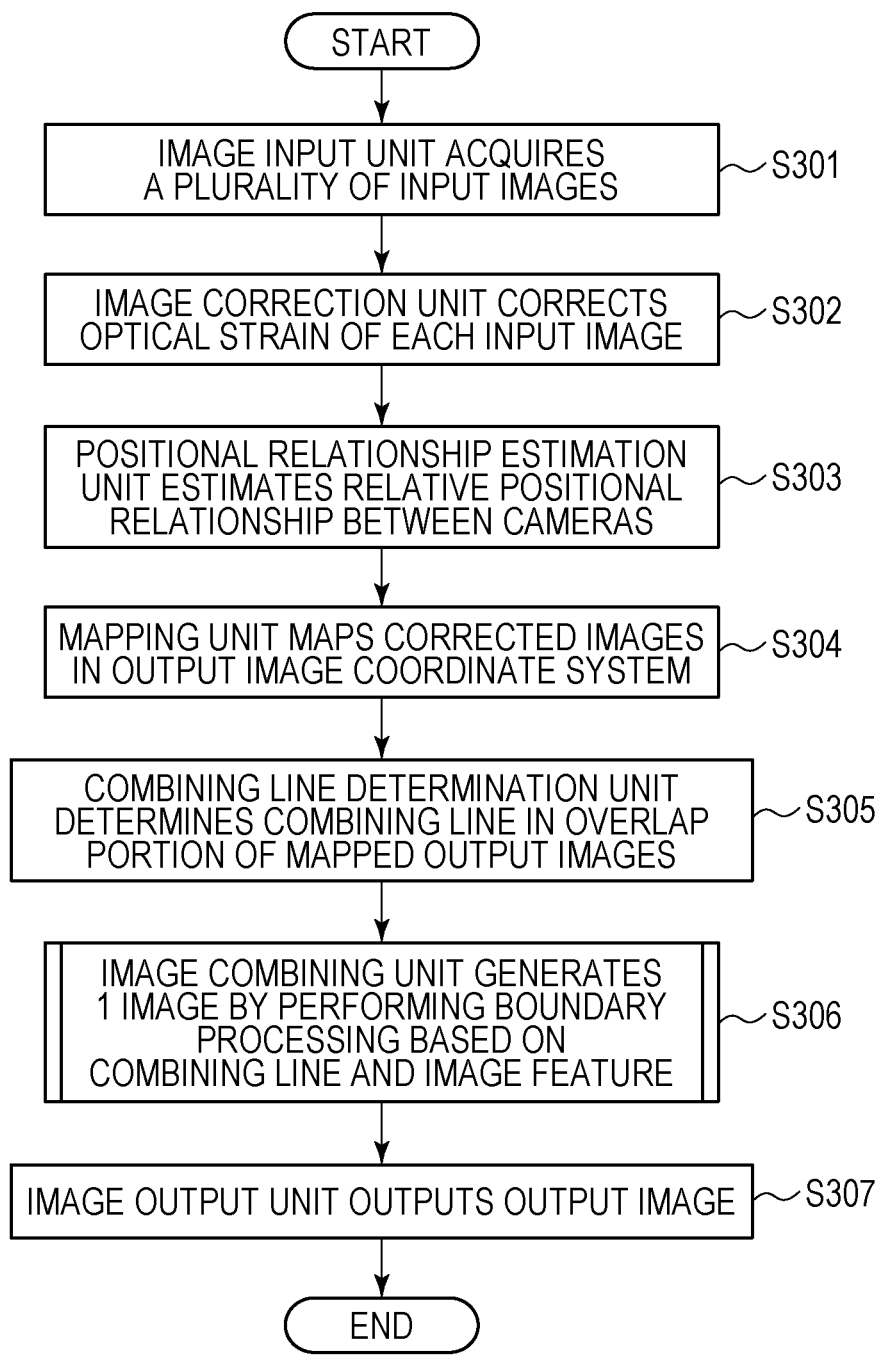
FIG. 3 is a flowchart illustrating a flow of processing performed by the image processing apparatus.

FIG. 3 is a flowchart illustrating a flow of processing executed by the image processing apparatus 100 according to the present exemplary embodiment. The CPU 101 reads out and executes a program according to the flowchart illustrated in FIG. 3.

Figure 4:
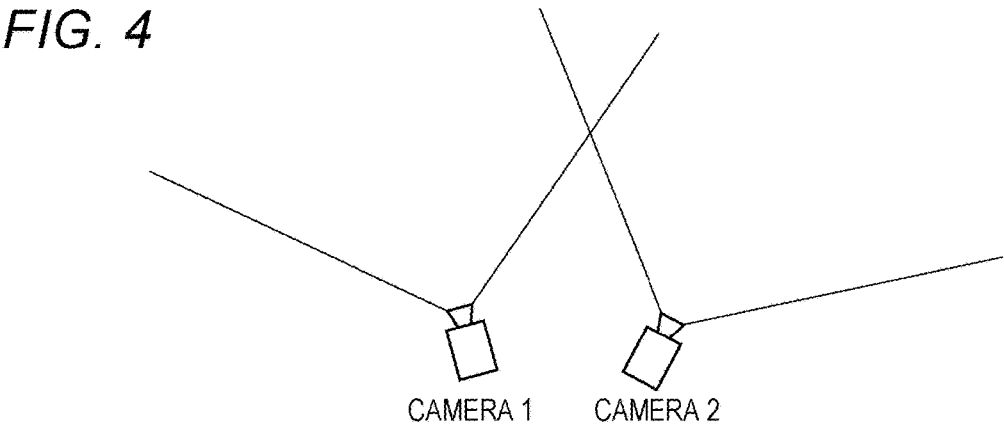
FIG. 4 is a diagram illustrating a positional relationship between cameras in capturing images according to a first exemplary embodiment.

In step S301, the image input unit 202 acquires a plurality of images input from the input terminal 201. The description will now be given of an example case of inputting images obtained by 2 cameras (imaging devices 110) arranged as illustrated in FIG. 4, capturing images in different directions at substantially the same timing. As illustrated in FIG. 4, cameras 1 and 2 are capturing images in directions set so as to include partially-overlapping regions.

Next, in step S302, the image correction unit 203 performs correction processing on each image. Generally, an image obtained by shooting is influenced by the optical distortion of a lens. The image correction unit 203 corrects the optical distortion of lenses in the imaging devices 110, and converts image data into corrected images with suppressed influence of the optical distortion. Known methods can be used as the correction processing. For example, the image correction unit 203 may use a method of rearranging pixels constituting an image, based on the characteristics of a lens used in image capturing.

In step S303, the positional relationship estimation unit 204 estimates a positional relationship between the imaging devices 110 that have captured the images. The images input from the 2 imaging devices 110 partially include the overlap region including the same subject. Thus, the positional relationship estimation unit 204 extracts feature points in the overlap region of the respective corrected images, and associates the feature points between the plurality of image data. The associated feature points are referred to as corresponding points. Based on the corresponding points, the positional relationship estimation unit 204 obtains a relative positional relationship between the cameras. In this embodiment, the positional relationship is expressed by rolling, pitching, and yawing angles ($\varphi, \theta, \psi$) for each camera where each angle represents the direction the camera axes orient to, assuming that all cameras are at the same position.

Figure 5:
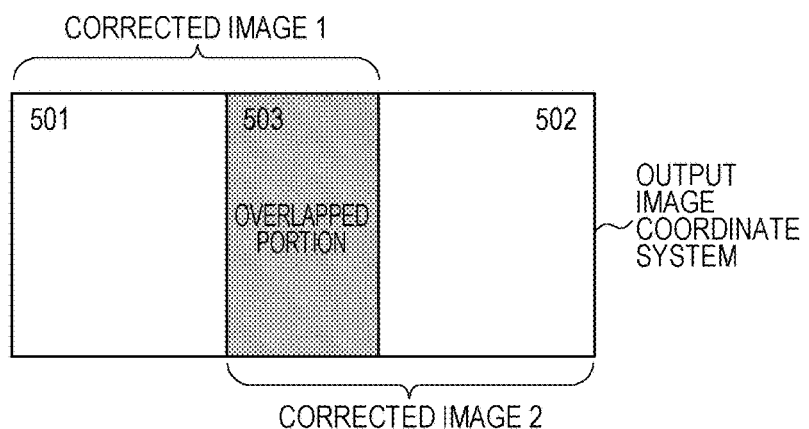
FIG. 5 is a diagram illustrating mapping ranges of corrected images in an output image coordinate system.

Next, in step S304, the mapping unit 205 maps the corrected images into an output image coordinate system based on the estimated positional relationship between the cameras. The output image coordinate system is a coordinate system corresponding to a panoramic image to be generated. FIG. 5 illustrates a result obtained by mapping the images captured under the condition illustrated in FIG. 4, in the output image coordinate system. The image acquired from the camera 1 is mapped after being converted into a corrected image 1 (illustrated as 501 and 503), and the image acquired from the camera 2 is mapped after being converted into a corrected image 2 (illustrated as 502 and 503). An overlap region 503 is a region in which both of the image acquired from the camera 1 and the image acquired from the camera 2 are mapped. In this manner, the plurality of input images gathers in the single output image coordinate system. In addition, the output image coordinate system is not limited to a perspective projection generally used for photographs. A coordinate system such as an equidistant cylindrical projection (equirectangular) may be used according to the intended purpose.

Figure 6:
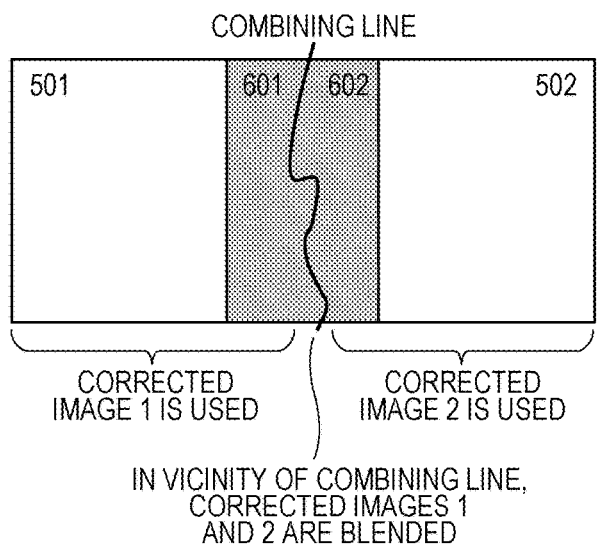
FIG. 6 is a diagram illustrating a relationship between a combining line and an image used as an output image.

Next, in step S305, the combining line determination unit 206 determines a position of a combining line for connecting the plurality of images, in the overlap region in the output image. The combining line is a boundary line that defines which of the mapped images in the overlap region is to be mainly used. In other words, a position of a region in which the plurality of images are combined is identified based on the combining line. For example, the combining line is determined as a combining line indicated by a solid line in FIG. 6. In addition, the combining line may also be referred to as a connection point, a joint line, a joint surface, a seam, and the like. In the present exemplary embodiment, the combining line is obtained by a graph cut method that uses a change in pixel value as an energy cost, which is a known technique.

In step S306, the image combining unit 207 generates 1 panoramic image by combining the mapped corrected images based on the combining line determined in step S305. The image combining unit 207 performs boundary processing for suppressing a situation in which the boundary of images becomes noticeable and the images look discontinuous in the position of the combining line. The image combining unit 207 performs the boundary processing by blending the mapped images of the corrected images overlapping in the vicinity of the combining line. The processing executed by the image combining unit 207 will be described in detail later. In step S307, the image output unit 208 outputs the panoramic image generated in step S306, to the HDD 104, the output device 106, the external storage device 112, or the like. The generation processing of the panoramic image performed by the image processing apparatus 100 in the present exemplary embodiment is completed in this manner.

Figure 7:
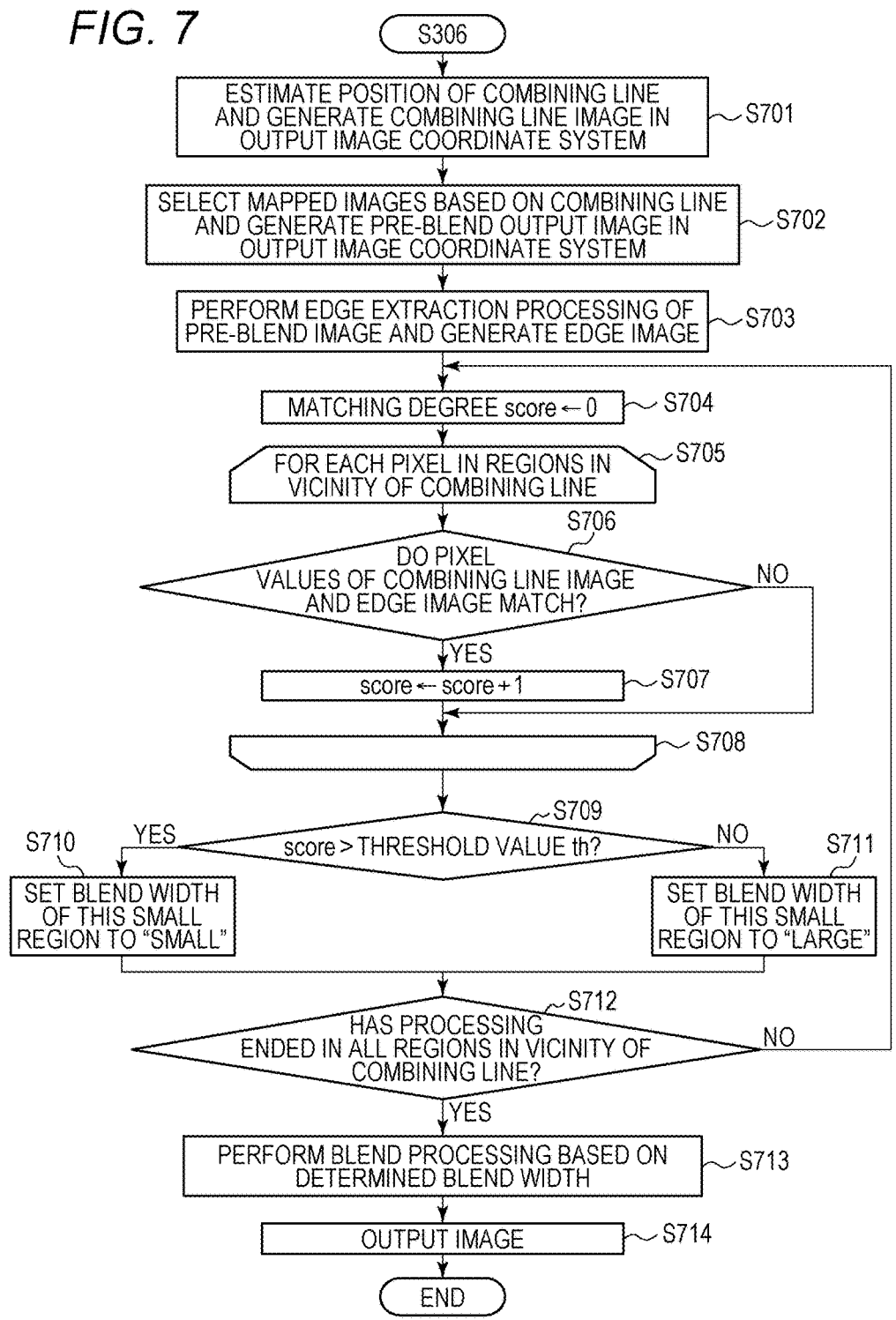
FIG. 7 is a flowchart illustrating a flow of processing performed by an image combining unit according to the first exemplary embodiment.
Figure 13:
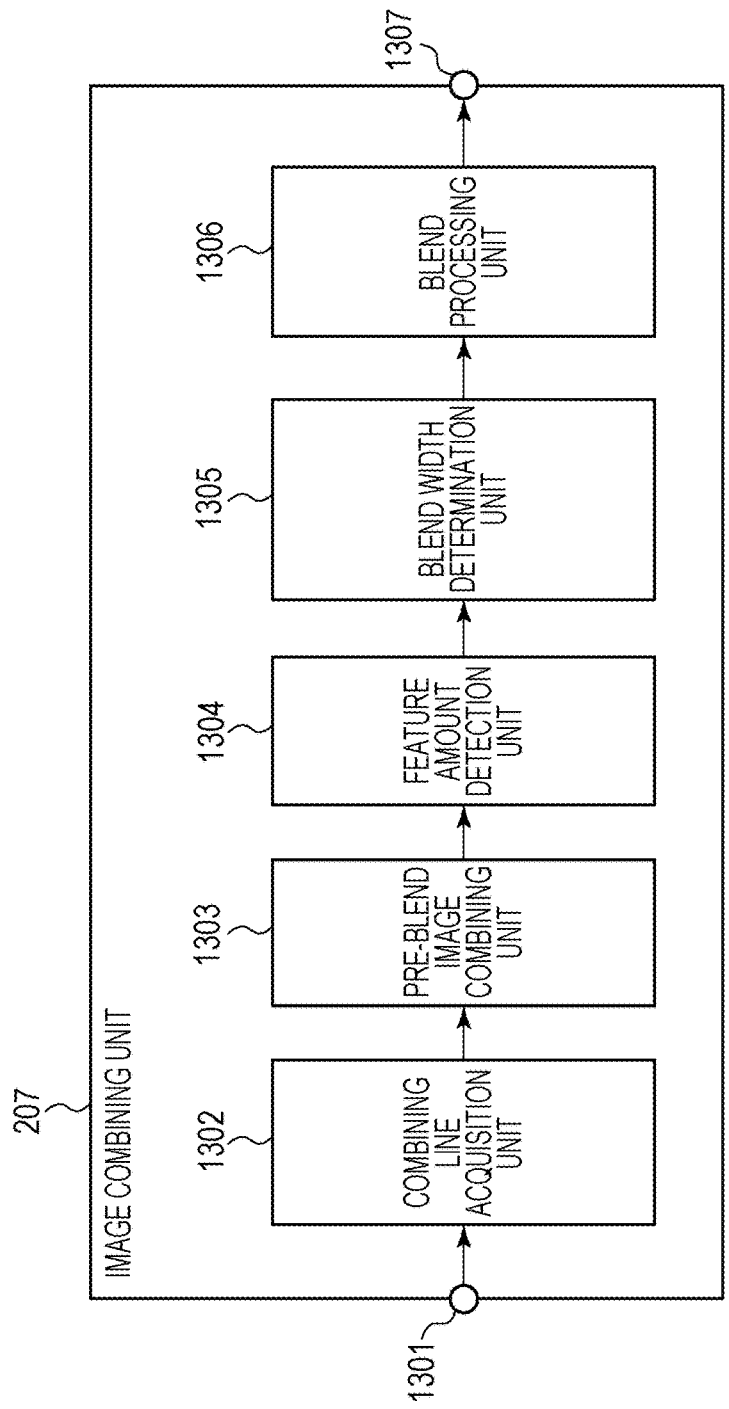
FIG. 13 is a block diagram illustrating a functional configuration of the image combining unit.

Next, the processing in step S306 executed by the image combining unit 207 will be described in detail. When generating the output image, the image combining unit 207 determines pixel values in the output image by mainly referring to information (pixel values) of the corrected image 1 in a region 501 of the overlap region that is on the left side of the combining line, or referring to information (pixel values) of the corrected image 2 in a region 502 of the overlap region that is on the right side of the combining line. Nevertheless, in the overlap portion, both pieces of information of the corrected images 1 and 2 can be used. Thus, in the vicinity of the combining line, the image combining unit 207 generates the output image by performing, as the boundary processing, blend processing using both pieces of information of the corrected images 1 and 2. The processing can make an unnatural color change in the output image less noticeable. Such a color change is caused in the vicinity of the combining line by combining the corrected images 1 and 2. FIG. 13 illustrates a block diagram of the image combining unit 207 according to the present exemplary embodiment. In addition, FIG. 7 is a flowchart illustrating the details of the combining processing performed in step S306 by the image combining unit 207.

Figure 12:
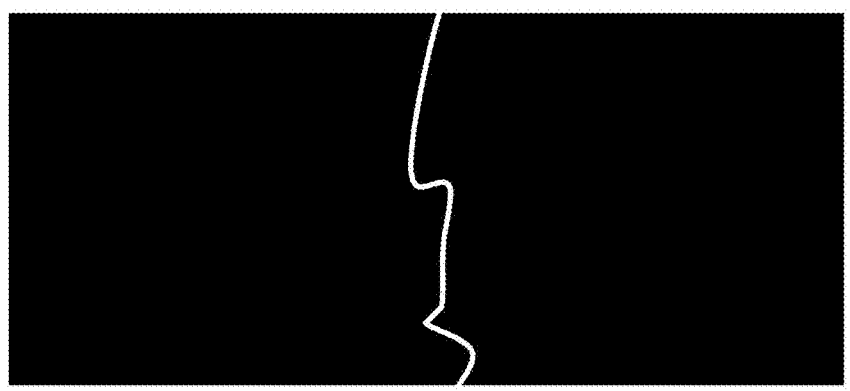
FIG. 12 is a diagram illustrating an example of a combining line image.

In step S701, a combining line acquisition unit 1302 identifies the position of the combining line, and generates a combining line image in the output image coordinate system. In the present exemplary embodiment, the combining line acquisition unit 1302 generates an image in which pixels positioned on the combining line are represented in white color (e.g., pixel value 255), and pixels at the other positions are represented in black color (pixel value 0), as illustrated in FIG. 12.

Next, in step S702, a pre-blend image combining unit 1303 selects a corrected image to be used for each pixel, based on the combining line obtained in step S304, and generates an image in the output image coordinate system. More specifically, the pre-blend image combining unit 1303 selects a pixel value of each pixel from the corrected image 1 on the left side of the combining line, and a pixel value of each pixel from the corrected image 2 on the right side of the combining line. Nevertheless, the blend processing has not been performed on the vicinity of the boundary line at this time point. The image generated in this step will be hereinafter referred to as a pre-blend output image.

In step S703, a feature amount detection unit 1304 performs edge extraction processing of the pre-blend output image obtained in step S702. That is, a feature amount corresponds to an edge component in this example. Known techniques can be used for the edge extraction processing. For example, a conceivable method is to perform Laplacian filter processing on a pre-blend image, and then perform binarization processing through comparison with a predetermined threshold value. The image obtained in this manner has the same size as that of the output image in the output image coordinate system, and is an image in which an edge portion is represented in white color (pixel value 255) irrespective of the direction of the edge, and the remaining portions are represented in black color (pixel value 0). This image will be hereinafter referred to as an edge image.

In subsequent steps S704 to S708, a blend width determination unit 1305 calculates the degree of match (hereinafter, referred to as a matching degree) between an edge component and the combining line in each region in the vicinity of the combining line of the output image. In step S704, the blend width determination unit 1305 substitutes 0 into a variable score representing the matching degree, to initialize the score. The processing in steps S705 to S708 is processing to be repeatedly performed for each pixel in regions in the vicinity of the combining line. The regions refer to blocks including the combining line among blocks obtained by dividing the combining line image into N×N blocks, for example. In step S706, the blend width determination unit 1305 compares pixel values of the respective pixels at a target pixel position in the combining line image obtained in step S701 and the edge image obtained in step S703. If the pixel values match, that is, if there is an edge in the position of the combining line (YES in step S706), the processing proceeds to step S707, in which the blend width determination unit 1305 increments the score (an evaluation value representing the matching degree). In the present exemplary embodiment, if the combining line and an edge component overlap, the score is incremented by 5, and at the remaining points in the regions, the score is incremented by 1. Nevertheless, values to be set are not limited to these values. If the pixel values do not match (NO in step S706), step S707 is skipped. The processing is performed on all the pixels in the regions.

Figure 8:
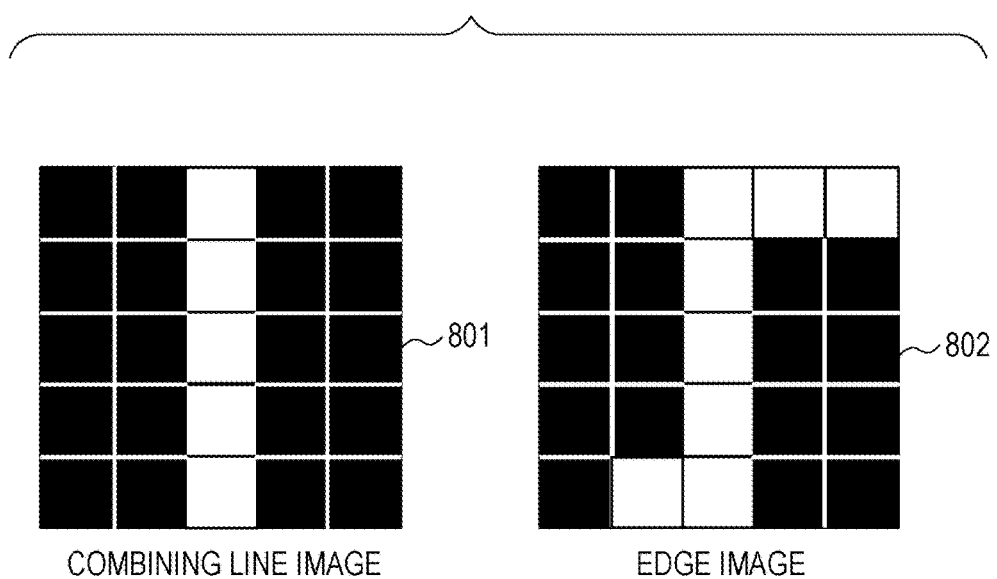
FIG. 8 is a diagram illustrating examples of combining line vicinity regions of a combining line image and an edge image.

FIG. 8 is a diagram illustrating respective partial regions of the combining line image and the edge image. These regions are blocks each including 5 pixels×5 pixels (N=5). A region 801 in the combining line image and a region 802 in the edge image correspond to each other. When pixel values of the respective pixels are compared, and the processing in steps S704 to S708 is repeated, the score of this region becomes 42. In addition, the value of the score may be normalized by dividing the score by an area (the number of pixels) of the region. It is defined that the combining line is represented in white color and the remaining portions are represented in black color in the combining line image, whereas the edge portion is represented in white color and the remaining portions are represented in black color in the edge image. The score becomes larger when the combining line and the edge components overlap, but when many edge components exist in pixels other than the combining line, the score does not grow and becomes relatively smaller as compared with that in the other cases. Thus, a high score represents that the combining line and an edge of an image representing a scene match, or exist along each other.

If the processing has ended in all the pixels in the regions, the processing proceeds to step S709, in which the blend width determination unit 1305 compares the matching degree score with a predetermined threshold value th. If the score is larger than the predetermined threshold value th (YES in step S709), the processing proceeds to step S710, in which the blend width determination unit 1305 sets a range (blend width) in which the blend processing is performed in the corresponding region to be small. In other words, the blend width determination unit 1305 sets a flag indicating the blend width to "small". In contrast, if the score is equal to or smaller than the predetermined threshold value th (NO in step S709), the processing proceeds to step S711, in which the blend width determination unit 1305 sets the blend width in the corresponding region to be large. In other words, the blend width determination unit 1305 sets a flag indicating the blend width to "large". An arbitrary value can be set as the threshold value th used in this step. In the present exemplary embodiment, the threshold value th=40 is set by reference to the scores set in such a manner that the score=45 is set when the regions 801 and 802 completely match, the score=20 is set when no edge component exists in the region 802, and the score=25 when all the pixels are edge components. Then, the processing proceeds to step S712, and the above-described processing is repeated until the processing in steps S704 to S712 is performed on all the combining line vicinity regions.

In step S713, a blend processing unit 1306 performs the blend processing using the determined blend width flag. In the present exemplary embodiment, as illustrated in FIG. 9, the blend processing unit 1306 initially separates the output image into ranges in which the respective corrected images are used, using the combining line as a boundary. An image 901 indicates a range in which the information of the corrected image 1 is used, and an image 902 indicates a range in which the information of the corrected image 2 is used. In FIG. 9, white color portions indicate the ranges in which the respective corrected images are used. The image 901 is used as a map for determining a weight to be added on each pixel in the corrected image 1, and the image 902 is used as a map for determining a weight to be added on each pixel in the corrected image 2. Hereinafter, the image 901 is referred to as a map M1 indicating whether to refer to a pixel value of each pixel in the corrected image 1, and the image 902 is referred to as a map M2 indicating whether to refer to a pixel value of each pixel in the corrected image 2. In this example, the blend processing unit 1306 separates the output image in such a manner that the combining line is included in both of a white color portion in the map M1 and a white color portion in the map M2. Next, the blend processing unit 1306 performs dilating processing of dilating the white color portions by increasing the number of white pixels in the maps M1 and M2. Specifically, the blend processing unit 1306 converts part of black pixels positioned at the boundary between the white color portion and a black color portion, into white pixels. At this time, the number of times of the dilating processing is varied in such a manner that the number of pixels converted from black pixels into white pixels in the region with a flag indicating "large" becomes larger than that in the region with a flag indicating "small". In this example, if a flag of a target region having 5 pixels×5 pixels is set to "small", the blend processing unit 1306 detects 5 black pixels positioned at the boundary between the white color portion and the black color portion, and converts the 5 black pixels into white pixels, and then, ends the dilating processing. If a flag of the target region is set to "large", the blend processing unit 1306 detects 5 black pixels positioned at the boundary between the white color portion and the black color portion, and converts the 5 black pixels into white pixels. The detection of black pixels and the conversion processing into white pixels are repeated until black pixels adjacent to white pixels become nonexistent. In other words, if the flag is set to "large", all the black pixels in the region are converted into white pixels. Alternatively, the number of black pixels converted into white pixels in a single execution of the processing may be varied for each region. As described above, the number of pixels that are white pixels in both the maps M1 and M2 is determined for each region by reference to a flag for controlling the blend width. In the region with the flag indicating "large", the width of an overlapping white color portion is larger as compared with that of the region with the flag indicating "small". The arrows in the images 901 and 902 represent that part of black pixels are changed to white pixels through the processing in step 713 in such a manner that white pixels dilate toward the directions indicated by the arrows. A difference in the length of the arrows conceptually represents that the degree of dilation varies depending on a flag set for each region. The description here has been given of the processing of changing black pixels into white pixels. Alternatively, black pixels (pixel value=0) may be changed to pixels with pixel values 1 to 244. In addition, the dilating processing is not limited to the above-described processing. Commonly-known dilating processing (Dilate) using a filter can also be used.

If the dilating processing has ended, a pixel value R (x, y) of the output image is determined according to the following formula:

[Math. 1]

$$R(x, y) = \frac{M1(x, y) \times I1(x, y) + M2(x, y) \times I2(x, y)}{M1(x, y) + M2(x, y)}, \quad (1)$$

where, in the coordinate (x, y) of the output image R, pixel values of the respective pixels in corresponding maps are denoted by M1 (x, y) and M2 (x, y), and pixel values of the respective pixels constituting the corrected images 1 and 2 are denoted by I1 (x, y) and I2 (x, y), respectively. According to the above-described formula (1), as for a pixel (M1 (x, y)=255, M2 (x, y)=0), a pixel value of which is determined by reference to only the corrected image 1, the pixel value I1 (x, y) of the corrected image 1 is output as the pixel value R (x, y). On the other hand, as for a pixel (M1 (x, y)=0, M2 (x, y)=255), a pixel value of which is determined by reference to only the corrected image 2, a pixel value I2 (x, y) of the corrected image 2 is output as the pixel value R (x, y). In addition, if a pixel is a white pixel in both of the map M1 corresponding to the corrected image 1 and the map M2 corresponding to the corrected image 2, an average value of the pixel value I1 (x, y) of the corrected image 1 and the pixel value I2 (x, y) of the corrected image 2 is output as the pixel value R (x, y). In this manner, in the vicinity of the combining line in the output image, pixel values of part of pixels are calculated from both of the pixels in the corrected image 1 and the pixels in the corrected image 2, and the calculated pixel values are blended. As described above, a blend width of a block with a higher matching degree between the edge and the combining line is set to be narrow, whereas a blend width of a block with a lower matching degree between the edge and the combining line is set to be wide.

Figure 10:
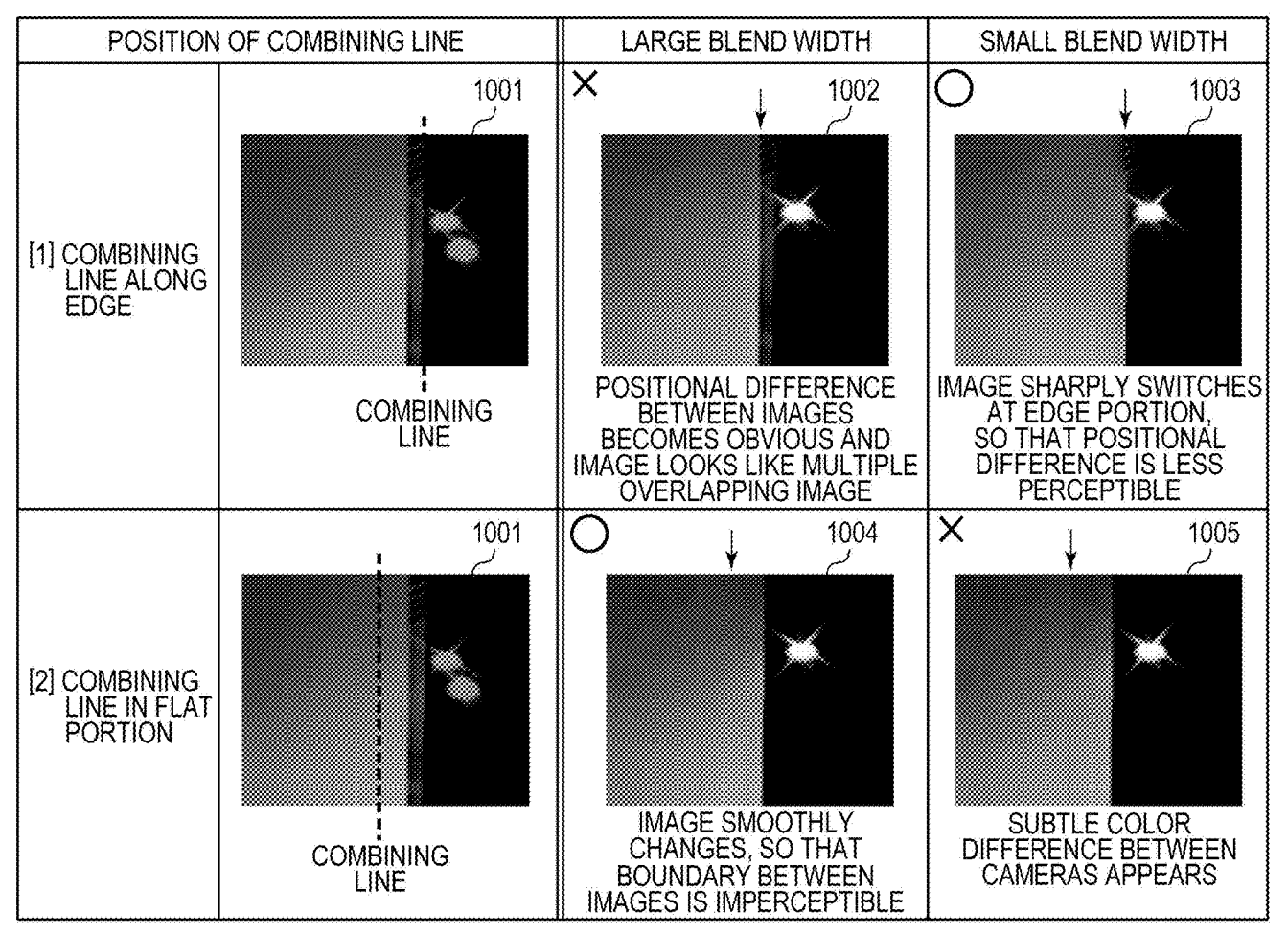

An effect obtained by the above-described processing will be described with reference to FIG. 10 illustrating specific examples for description. FIG. 10 illustrates a table organizing results obtained when the boundary processing is performed using varied blend widths, in a case in which 2 images and a combining line are set. An image 1001 is a part of an overlap region of the 2 images in the output image coordinate system. In the image 1001, the 2 images are displayed in an overlapping manner. Because the positions of cameras set in capturing the 2 input images are different, the positions of an object in a scene do not always match, and a positional difference is generated. Thus, the image 1001 is displayed like a multiple overlapping image. Such a positional difference is likely to be generated especially in a case in which cameras are arranged in nonparallel with an angle as illustrated in FIG. 4.

Assumptions are made on a case [1] in which a combining line is set along an edge of an image, and a case [2] in which a combining line is set in a flat portion of an image. The table further indicates cases in which the blend processing is performed using a relatively large blend width and a relatively small blend width in each of the cases [1] and [2]. First, the consideration is given to the case [1] in which a combining line is set along an edge of an image, shown on the upper row in the table. An image 1002 is an image obtained by performing the blend processing using a relatively large blend width in the vicinity of the combining line. In the blend processing, pixel values of pixels in the overlapping 2 images are both used. Nevertheless, because a positional difference is generated, pixels at the same pixel position do not correspond to the same subject. Thus, in the image 1002, pixel values corresponding to different subjects are blended in a relatively wide range. This causes the image 1002 to appear as a multiple overlapping image. In addition, the sharpness of the edge deteriorates.

On the other hand, an image 1003 is an image obtained by performing the blend processing using a relatively small blend width in the vicinity of the combining line. In the image 1003, a range in which pixel values of 2 input images are used is smaller than that in the image 1002, and an image to be used sharply switches. As a result, a multiple overlapping image becomes less perceptible than in the image 1002. In particular, a difference between the images 1002 and 1003 can be clearly seen by comparing the portions of the images 1002 and 1003 that are indicated by arrows.

The consideration is given to the case [2] in which a combining line is set in a flat portion of an image, shown on the lower row in the table. An image 1004 is an image obtained by performing the blend processing using a relatively large blend width in the vicinity of the combining line. In the image 1004, an image smoothly changes in the vicinity of the combining line, so that the switching of the image is less perceptible. In contrast, an image 1005 is an image obtained by performing the blend processing using a relatively small blend width in the vicinity of the combining line. In the image 1005, an unnatural color change is perceived in the vicinity of the combining line, although the region is originally a region with a small color change. Such a change is attributed to the individual difference between cameras, and differences in an illumination condition and a shooting condition. A slight color difference and the like in recorded captured images are made obvious due to the sharp switching of an image to be used, leading to such an unnatural color change. A difference between the images 1004 and 1005 can be clearly seen by comparing the portions of the images 1004 and 1005 that are indicated by arrows.

As clearly seen from these examples, appropriate blend processing varies depending on the position of a combining line of an image and an image feature. In particular, if a scene has a positional difference between a plurality of input images as in the present exemplary embodiment, the combining line cannot always be set at a location in which the positions of the scene match. Thus, in the present disclosure, a blend width is determined based on a matching degree between the position and direction of a combining line representing a boundary, and the position and direction of edge components of an image. If the combining line matches the edge in the scene, setting a blend width to be small can prevent a multiple overlapping image from appearing at the boundary thereof. In addition, on the other hand, if the edge does not match the boundary line (e.g., portion having no edge in the scene), setting a blend width to be relatively large can hide an unnatural color change in an image that is attributed to the individual difference between cameras.

As described above, according to the present exemplary embodiment, in the case of combining a plurality of images, by controlling a width in which the plurality of images are blended in the boundary region, a high quality combined image with less perceptible image switching can be obtained while suppressing a multiple overlapping image and deterioration in sharpness.

<Modified Example of First Exemplary Embodiment>

The above-described exemplary embodiment can be preferably executed as a modified example described next.

The processing in steps S704 to S708 is performed for the purpose of calculating a matching degree between edge components of an image and a combining line in each region of an output image. Thus, a method for achieving this purpose is not limited to the above-described flow. For example, before step S704, resolution conversion processing may be additionally performed on both images of a pre-blend output image and an edge image for reducing their image sizes. This can suppress influence of noise generated in the edge extraction processing and erroneous determination caused by a subtle difference. More specifically, the resolution conversion processing can suppress a situation in which a matching degree fails to be accurately determined due to a subtle difference although the combining line and the edge components substantially match each other. Furthermore, reduced image sizes can shorten a processing time.

In addition, the blend width determination unit 1305 may be configured to calculate an evaluation value of a region by calculating a plurality of evaluation value candidates, and then, determining the highest value as the evaluation value. For example, because there is a subtle difference between the edge image and the combining line image, in some cases, an evaluation value indicating a matching degree becomes small although the edge and the combining line are essentially similar to each other. Thus, the blend width determination unit 1305 may be configured to calculate, as evaluation value candidates, matching degrees obtained by shifting the edge image and the combining line image in a plurality of directions by several pixels, and to adopt the maximum value.

In the first exemplary embodiment, processing of extracting edge components in all directions irrespective of directions is used as the edge extraction processing. Nevertheless, a method that can extract an edge component for each direction of the edge may be employed as the edge extraction processing. For example, processing of extracting edge components in an x-axis direction (the horizontal direction) is performed, and a matching degree between the edge components and the combining line in the x-axis direction is calculated. Then, processing of extracting edge components in a y-axis direction (vertical direction) is performed, and a matching degree between the edge components and the combining line in the y-axis direction is calculated. It can be thereby determined whether the direction of the combining line is substantially the same direction as the direction of the edge. In the first exemplary embodiment, although the direction of an edge in an image and the direction of a combining line are different from each other, even the existence of edge components possibly contributes to a matching degree. Nevertheless, by evaluating a matching degree for each direction of the edge, it can be determined more accurately whether the edge components and the combining line exist along each other.

In the above-described exemplary embodiment, an N×N square block is used as a region for calculating an evaluation value indicating a matching degree. Nevertheless, evaluating a matching degree according to a shape suitable for the edge components or the combining line is advantageous in that an area ratio of the combining line to a region can be increased. For example, a horizontally-oriented rectangle can be set as a region for edge components in the x-axis direction (horizontal line direction). After the edge components in the x-axis direction are extracted, a matching degree in the x-axis direction is calculated using the horizontally-oriented rectangle as a region. In addition, as for edge components in the y-axis direction, a matching degree in the y-axis direction is calculated using a vertically-oriented rectangle as a region. With this configuration, a region set in accordance with the direction of edge components can be adopted.

In addition, a unit of determining a blend width is not limited to a rectangular region. For example, first, a combining line image is divided into N×N square blocks. Next, the dilating processing (Dilate) is performed on the combining line. In each of the N×N block regions, only pixels with pixel values other than 0 (pixels related to the dilation of the combining line) in blocks including the combining line having been subjected to the dilating processing are counted as regions. With this configuration, regions set along the direction of the combining line can be obtained. In addition, it is to be noted that the dilating processing performed on the combining line in this case is processing for obtaining combining line vicinity regions, and the combining line to be used in subsequent processing is the combining line in a state in which the dilating processing is not performed. If a region used as a unit of determining a blend width is set to a smaller region, the blend width of an image can be controlled more finely. This is because, when a block region is large, even if there is variation in image feature amount within the region, a blend width flag of a single type is assigned to the region. For example, if edge components exist on the lower side of an image but no edge component exists on the upper side as illustrated in FIG. 18, the score of the region in FIG. 18 is calculated to be score=33, and a blend width is set to "large" according to score th (=40). Nevertheless, if the consideration is given to a case in which this region is divided into regions 1802 and 1803, it is desirable that a large blend width is set to the region 1802 and a small blend width is set to the region 1803. For preventing such a situation, a region is set to be smaller within a range in which an image feature amount can be accurately detected. Alternatively, a predetermined region can be further divided into small regions depending on whether there is a variation in image feature amount in the direction of a combining line. For example, in FIG. 18, edge components of pixels corresponding to the combining line are first checked for checking the possibility of variation in image feature amount. As a result, there is no edge component in 2 pixels from the top on the combining line, but there are edge components in 3 pixels from the bottom. It is accordingly determined that variation may exist in the direction of the combining line, and the block is divided by a line vertical to the combining line. Then, for each region obtained by the division, a feature amount is calculated and a blend width flag is set. If no variation is found among edge components of pixels corresponding to the combining line (if almost all of the pixels are edge pixels or non-edge pixels, or edge components and non-edge components exist in a patchy fashion irrespective of the direction of the combining line), the division is not performed and a blend width flag is set for the predetermined region. In this manner, a blend width can be controlled more finely. In addition, a known method for detecting variation in feature amount and a known dividing method may be used in place of those in this example.

In the above-described exemplary embodiment, in the calculation of a matching degree, a pre-blend output image is generated according to a combining line, and the calculation is performed based on the generated pre-blend output image. More specifically, a matching degree is calculated only for an image to be actually used, among mapped images in an overlap portion. Nevertheless, matching degrees may be calculated for a plurality of overlapping mapped images, and the obtained information may be used for blend width control.

In addition, in the first exemplary embodiment, edge components are extracted as an image feature amount, and a matching degree with a combining line is calculated through the comparison of pixels. Nevertheless, a calculation method of a matching degree between the edge components and the combining line is not limited to this calculation method. As another example, there is a method of using template matching between a combining line image and an edge image. A matching degree in the template matching obtained at this time may be used. Alternatively, a frequency characteristic of a combining line image and a frequency characteristic of an edge image in a target region may be compared, and a blend width may be controlled according to the degree of match therebetween.

<Second Exemplary Embodiment>

In the first exemplary embodiment, edge components are extracted as an image feature amount, and a matching degree with a combining line is calculated. In a second exemplary embodiment, the description will be given of a method of referring to the degree of change in pixel value in the vicinity of a combining line, as an image feature amount. In addition, the description of configurations similar to those in the first exemplary embodiment will be omitted. In the second exemplary embodiment, step S306 in the flowchart illustrated in FIG. 3 is different from that in the first exemplary embodiment. Thus, step S306 in the second exemplary embodiment will be described in detail.

Figure 14:
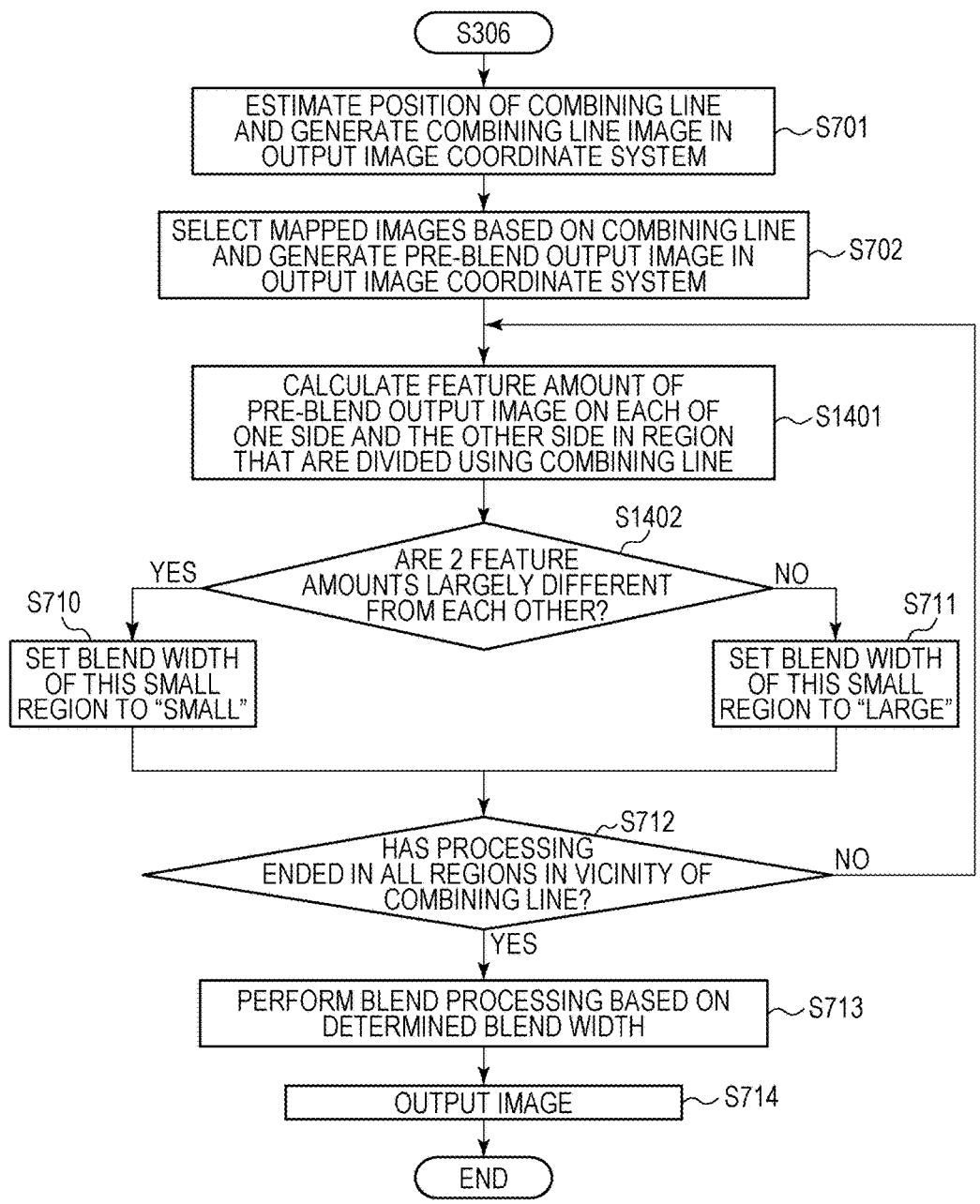
FIG. 14 is a flowchart illustrating a flow of processing performed by an image combining unit according to a second exemplary embodiment.

FIG. 14 is a flowchart illustrating the details of step S306 according to the second exemplary embodiment. The same processes as those in FIG. 7 are assigned the same numbers. In step S1401, the feature amount detection unit 1304 calculates an average value of pixel values of pixels in each of 2 small regions obtained by the division using the combining line, among combining line vicinity regions in a pre-blend output image. The 2 average values obtained in this step are output as feature amounts of a processing target region.

In step S1402, the blend width determination unit 1305 compares a difference between the average values for each region. If a difference between 2 average values in a region is larger than a predetermined threshold value (YES in step S1402), a blend width is set to be small. If a difference between 2 average values in a region is equal to or smaller than the predetermined threshold value (NO in step S1402), a blend width is set to be large. This means that, in a region, if the propensity of pixel values largely varies between 2 regions obtained by dividing the region using the combining line, the combining line is regarded as overlapping the boundary of the scene. In addition, in the present exemplary embodiment, a feature amount in a region is calculated based on a difference between average values. Alternatively, a total value, a ratio between the maximum pixel value and the minimum pixel value, the shape of a distribution (histogram) of pixel values, or the like can also be used.

In addition, besides pixel values, frequency characteristics may be used for comparing small regions obtained by dividing the region using the combining line. If the propensity of frequency characteristics largely varies between 2 regions in the region, the combining line is regarded as overlapping the boundary of the scene, and a blend width is set to be small. FIGS. 17A and 17B illustrate an example. FIGS. 17A and 17B are schematic diagrams each illustrating a portion in which a combining line exists in a certain texture portion. In FIG. 17A, the characteristic of the texture is the same in small regions on the right and left sides of the combining line. In contrast, in FIG. 17B, although the cycle of the texture is the same, the direction of the texture is different. If the propensity or characteristic varies between small regions obtained by dividing the region using the combining line, as illustrated in FIG. 17B, even if a clearly-seen edge does not exist in the position of the combining line, a substantive edge of a scene can be regarded as existing. In this manner, a substantive edge can be identified based on a difference in feature amount between small regions, and used for the control of a blend width.

<Third Exemplary Embodiment>

In a third exemplary embodiment, the description will be given of an example configuration obtained by combining the first exemplary embodiment and the second exemplary embodiment. If edge components in an image match a combining line, and a scene feature varies between 2 small regions obtained by the division using the combining line, a blend width may be set to be especially small.

Figure 11:
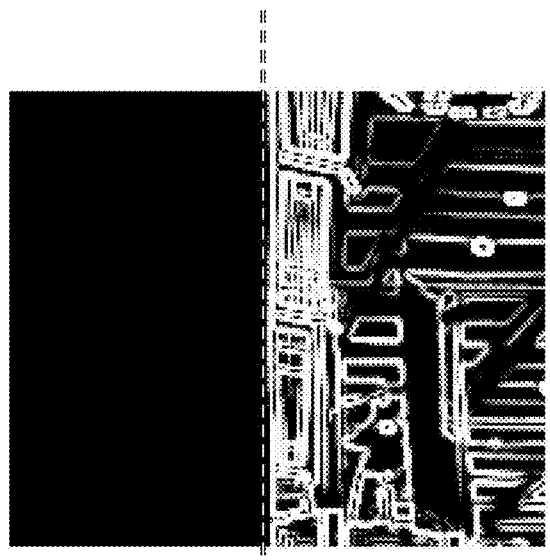
FIG. 11 is a diagram illustrating an example case in which an image feature varies between left and right sides of a combining line.

FIG. 11 illustrates an example of an image satisfying such a feature that edge components match a combining line, and a scene feature varies between 2 small regions obtained by the division using the combining line. In FIG. 11, the combining line and edge components match each other. Furthermore, in the image, the left side of the combining line has almost no edge component, whereas the right side has edge components, and a scene feature varies between 2 small regions obtained by the division using the combining line. These features can be rephrased as a low-frequency region for the left side and a high-frequency region for the right side. In such a case, a blend width is set to be especially small. With this configuration, a region to be switched sharply for preventing a multiple overlapping image and sharpness deterioration in combining 2 images can be determined more accurately.

<Fourth Exemplary Embodiment>

In a fourth exemplary embodiment, frequencies of combining line vicinity regions in a pre-blend output image are converted, and a blend width is controlled according to the frequency characteristics. If a target region mainly contains low-frequency components, it is determined that the target region is a region having low possibility that a combining line and an edge of a scene match, and a blend width is set to be large. On the other hand, if a target region mainly contains high-frequency components, a blend width is set to be smaller than that of the region mainly containing low-frequency components. Also in this configuration, an effect similar to that in the above-described exemplary embodiment can be expected.

In addition, a blend width may be controlled according to a matching degree between corresponding points in the respective mapped images in combining line vicinity regions in an overlap region. In step S303 in the first exemplary embodiment, the positional relationship estimation unit 204 extracts feature points from corrected images and associates the feature points between a plurality of images, to determine corresponding points. A relative positional relationship between cameras, i.e., a relative positional relationship between images in an output image coordinate system is estimated based on these corresponding points. Nevertheless, since the relative positional relationship is normally determined based on a plurality of feature points, each pair of corresponding points is not always mapped at the same coordinate on the output image coordinate system, and is mapped with a difference on the coordinate. If a difference between the corresponding points generated at this time is small, the scene can be said to have a relatively small difference and be in a matching state. In this case, the execution of the blend processing may deteriorate sharpness. It is therefore desirable to set a blend width to be relatively small.

<Fifth Exemplary Embodiment>

In the above-described exemplary embodiment, the processing is performed while changing a predetermined blend width according to the position of a combining line and an image feature amount. Nevertheless, if there is a sufficiently-accurate match in position and color between input images, a negative effect of sharpness deterioration caused by the blend processing becomes larger than a boundary portion smoothing effect. Thus, in the fifth exemplary embodiment, the description will be given of a method of basically setting a small blend width, and widening a blend width according to the position of a combining line and a feature amount.

Figure 15:
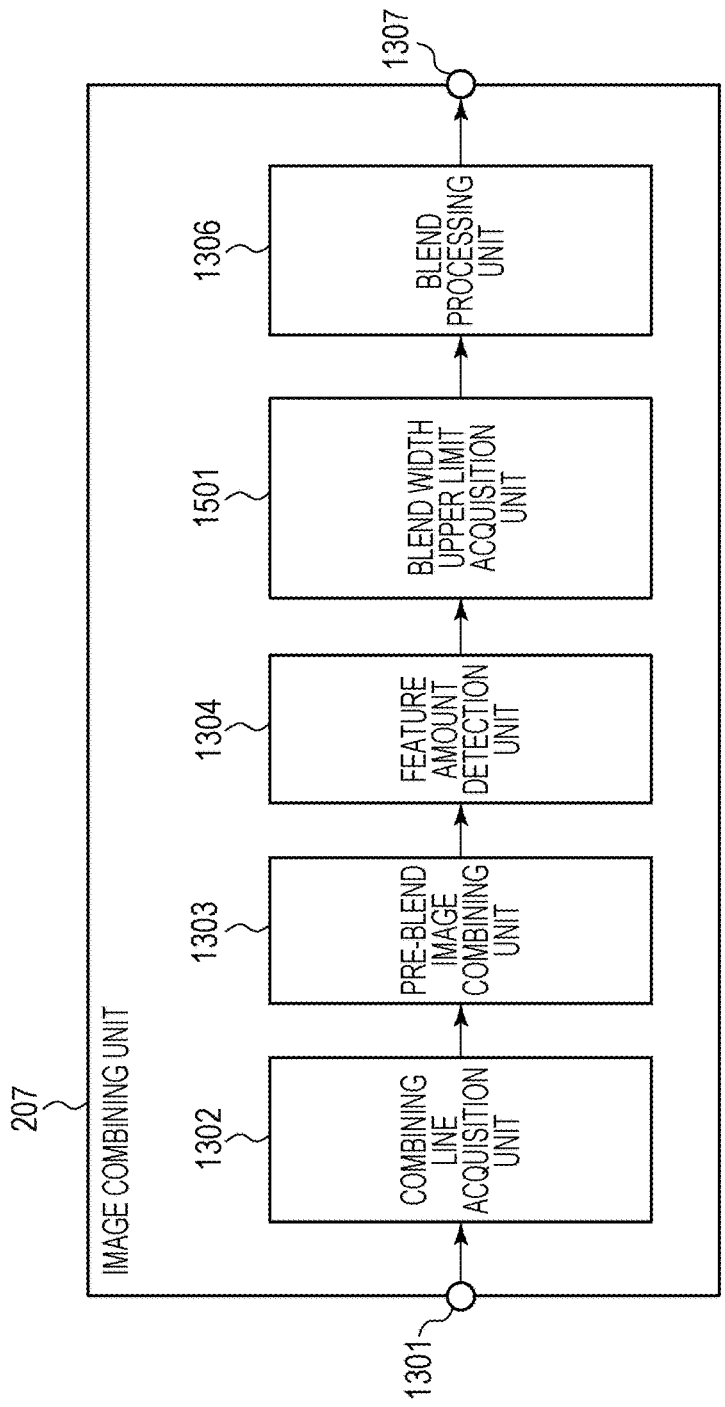
FIG. 15 is a block diagram illustrating a functional configuration of an image combining unit according to a fifth exemplary embodiment.
Figure 16:
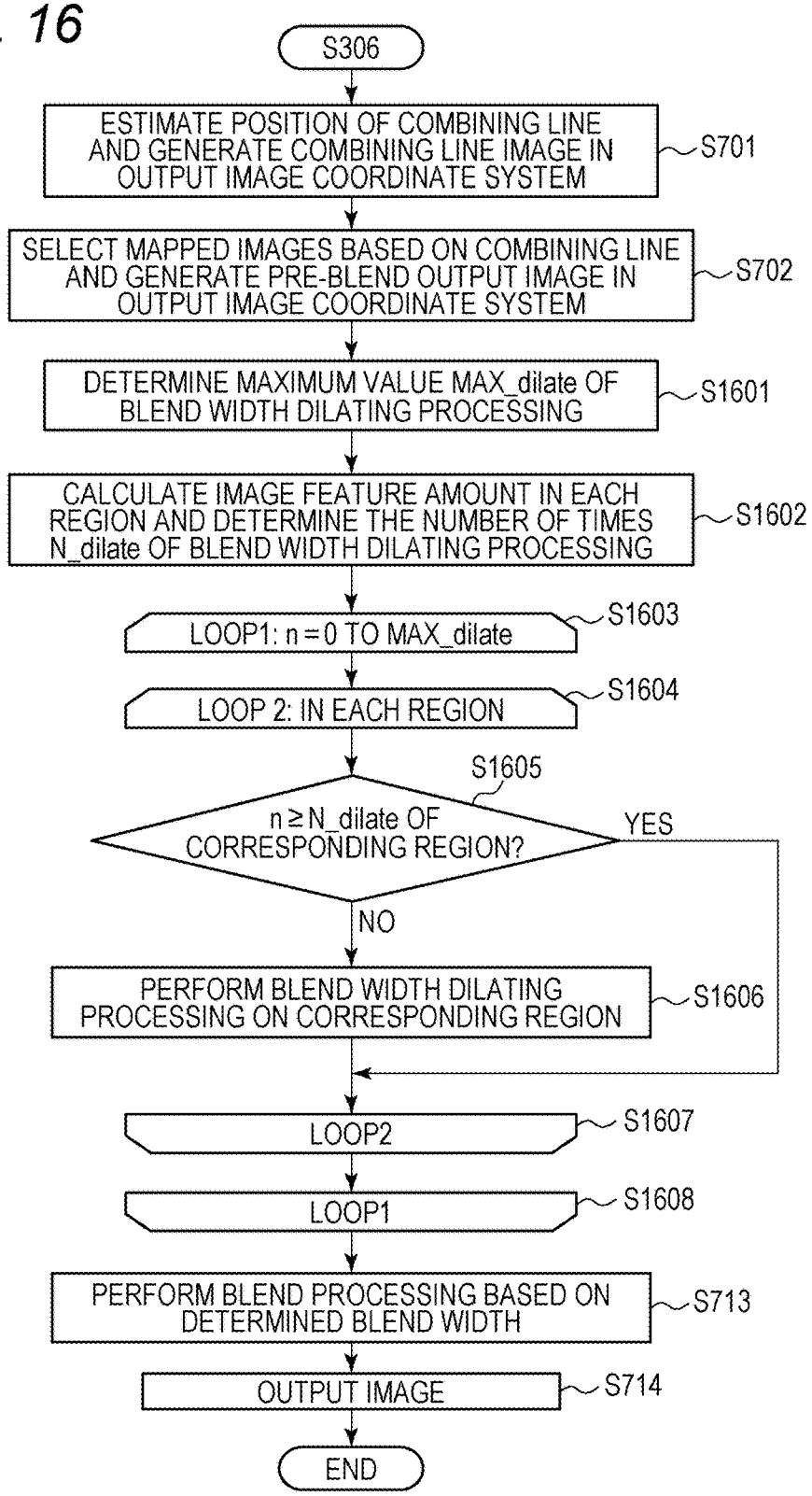
FIG. 16 is a flowchart illustrating a flow of processing performed by the image combining unit according to the fifth exemplary embodiment.

FIG. 15 is a block diagram illustrating a functional configuration of an image combining unit according to the present exemplary embodiment. FIG. 16 is a flowchart illustrating processing performed by the image combining unit. The processes similar to the processes already described are assigned the same numbers, and the description thereof will be omitted.

A blend width upper limit acquisition unit 1501 acquires a blend width upper limit value. The blend width upper limit value in step S1601 of the present exemplary embodiment corresponds to the number of times MAX_dilate of blend width dilating processing. The blend width upper limit value MAX_dilate is preferably set to an arbitrary value by the user as described later. Alternatively, a predetermined constant may be simply set as the blend width upper limit value MAX_dilate. Furthermore, the blend width upper limit value MAX_dilate may be determined by reference to a matching degree (coordinate difference on the output image) between corresponding points in the respective mapped images of each pair of corresponding points that has been estimated by the positional relationship estimation unit 204 as described. In this case, a larger coordinate difference between corresponding points indicates that a positional relationship between input images is not estimated accurately. Thus, a larger value is set as the blend width upper limit value MAX_dilate in this case.

Next, in step S1602, the blend processing unit 1306 determines a blend width in each region. For example, in step S1602 of the present exemplary embodiment, the blend width in each region corresponds to the number of times N_dilate of the blend width dilating processing. The determination of the number of times N_dilate in step S1602 is processing equivalent to the determination of a blend width flag in the above-described exemplary embodiment. More specifically, in the present exemplary embodiment, N_dilate=0 is set for a region for which a flag indicating a small blend width is set in the first exemplary embodiment, and N_dilate=2 is set for a region for which a flag indicating a large blend width is set. The number of times N_dilate may be determined independently from the blend width upper limit value MAX_dilate, and in particular, may be set to a number exceeding the blend width upper limit value MAX_dilate.

The processing in steps S1603 to S1608 is blend width dilating processing to be repeated (MAX_dilate+1) times on the entire image. In the n-th repetitive processing (n=0, 1, . . . , MAX_dilate), a magnitude relationship between n and N_dilate is compared for each region (steps S1604 to S1607). If it is determined in step S1605 that n is equal to or larger than N_dilate (YES in S1605), the blend width dilating processing is not performed on this region, and the processing proceeds to the processing of the next region. If it is determined in step S1605 that n is smaller than N_dilate (NO in S1605), the processing proceeds to step S1606, in which the blend width dilating processing is performed on this region, and then, the processing proceeds to the processing of the next region. The above-described processing is performed on all the regions and further repeated while incrementing n. After the processing in steps S1603 to S1608, in step S714, the blend processing unit 1306 performs the blend processing on the image based on the blend width determined for each region.

The details of the above-described processing will be described. The case of MAX_dilate=0 will now be considered. In this case, the determination in S1605 always indicates a positive result, so that the blend width dilating processing is not performed. As a result, a blend width is always set to the minimum value for any portion of the combining line irrespective of an image feature. The processing gives importance to the sharpness of an output image, and is effective in a case in which there is less necessity to smooth a boundary portion through the blend processing, because it can be determined that input images sufficiently match in position and color.

In the case of MAX_dilate=1, a blend width varies depending on a region, and the blend width dilating processing is performed once for a region with N_dilate=2 (flag indicating a large blend width), and the blend width dilating processing is not performed on a region with N_dilate=0 (flag indicating a small blend width). In contrast to the case of MAX_dilate=0, the blend processing is performed only on a region determined to be appropriate according to an image feature, using the blend width upper limit value MAX_dilate=1 set so that the sharpness is not excessively lost.

In the case of MAX_dilate≥2, a blend width also varies depending on a region, but the blend width dilating processing is performed twice for a region with N_dilate=2 (flag indicating a large blend width), and the blend width dilating processing is not performed on a region with N_dilate=0 (flag indicating a small blend width). In other words, in contrast to the case of MAX_dilate=1, the processing is performed on the region with N_dilate=2 (flag indicating a large blend width) using a larger blend width. This is suitable for a case in which importance is given to smoothing of an image boundary portion. Nevertheless, even in this case, the blend width dilating processing is not performed on a region with N_dilate=0 (flag indicating a small blend width). In other words, the use of the number of times N_dilate obtained based on the position of the combining line and an image feature amount can prevent the processing from being performed using a blend width unnecessarily-large for each region, so that sharpness can be maintained. With the above-described configuration, a high quality combined image with less perceptible image switching can be obtained while suppressing a multiple overlapping image and deterioration in sharpness.

Lastly, the description will be given of an example in which the user preferably defines the blend width upper limit value MAX_dilate. First, the blend width upper limit value MAX_dilate is set to a predetermined value (e.g., MAX_dilate=0) as an initial value, and the processing in steps S1601 to S714 in FIG. 16 is performed. An output image output in step S714 is presented as a preview to the user via the output device 106. The user checks the preview, and checks the balance between smoothness and sharpness of a boundary portion. If the user desires to change the output image, the user designates a value of the blend width upper limit value MAX_dilate via the input device 108. The image processing apparatus 100 performs the processing again based on the newly-designated value of the blend width upper limit value MAX_dilate, and updates a preview. In this manner, the user can obtain an image with a desired sharpness and smoothness of a boundary portion that are controlled as desired by the user.

<Other Exemplary Embodiments>

In the above-described exemplary embodiments, the description has been given based on the 2 cases: a case in which a blend width is set to be large, and a case in which a blend width is set to be small. Nevertheless, a method of setting a blend width is not limited to this. For example, 3 or more cases may be provided. Furthermore, instead of a flag, an integer representing the number of times of the dilating processing, a parameter indicating the number of pixels to be converted from black pixels into white pixels, or the like may be used as a parameter for controlling a blend width. In addition, a blend width suitable in a case in which a combining line matches edge components may be set as a predetermined value, and a blend width may be controlled so as to be set to a blend width larger than the predetermined value if the combining line is positioned in a detected flat portion.

In addition, a blend width can be substantively controlled according to a value of a weight coefficient used in the blend processing, while keeping the number of pixels to be referred to in the blend processing, at a fixed number. For example, a weight set in a case in which 2 images are blended over 5 pixels will now be considered. When one weight coefficient is denoted by a, the other weight coefficient is denoted by 1−α. A substantive blend width in a case in which the images are blended using weight coefficients α [0.01, 0.02, 0.5, 0.98, 0.99] is smaller than that in a case in which the images are blended using weight coefficients α [0.1, 0.3, 0.5, 0.7, 0.9]. Even if the blend width is such a substantive blend width, and the number of pixels formally referred to is set to a fixed number, a blend width can be controlled by setting a weight coefficient to a value of approximately 0.

In the above-described exemplary embodiment, the description has been given based on relatively-simple alpha blending as the blend processing. Nevertheless, the blend processing is not limited to this. For example, embodiments of the present invention may be applied to multi-band blending processing of changing a blend parameter for each spatial frequency band of an image.

In the above-described exemplary embodiments, the description has been given assuming that the number of images to be combined is 2, for simplifying the description. Nevertheless, the number of input images is not limited to 2. Also in the case of combining a plurality of images being 3 or more images, the blend processing can be appropriately executed by performing the processing in a similar manner to the above-described exemplary embodiment. The above-described exemplary embodiments can also be applied to the case of generating a 360-degree omnidirectional panoramic image by arranging a plurality of cameras in such a manner that the plurality of cameras covers surrounding all directions. Furthermore, a stereo imaging device for obtaining a stereovision image may be used.

The above description has been given of an example of generating a panoramic image using a plurality of cameras. Alternatively, a plurality of input images may be obtained by varying a shooting time of a single camera. Specifically, input images may be obtained in such a manner that, in FIG. 4, one camera first obtains an image at the position of the camera 1, and next, the camera moves to the position of the camera 2 and obtains an image, instead of simultaneously using the cameras 1 and 2. In addition, a shooting time difference may be included when a plurality of cameras is used. Alternatively, a plurality of input image may be obtained by using a system in which a plurality of imaging units is arranged in a single imaging device in different directions or at different positions. The above description has been given of an example in which an image processing apparatus generates 1 piece of panoramic image data from a plurality of input images, and outputs the panoramic image data. In place of such a case, an image to be output may be an image itself that is to be combined in the real world, or partial image data used in the combining, instead of being in the form of 1 piece of image data. For example, so-called multi-projection can be considered as an example of such a case. In the multi-projection, a plurality of projectors is synchronously arranged in such a manner as to partially have an overlap in a display region, and displays an image with a wider viewing angle than each display region. Each projector projects an image corresponding to partial image data, and a final output image is formed by combining the partial image data in the real world. Embodiments of the present invention can be applied to such a case.

In the case of multi-projection, images obtained by dividing an image to be finally displayed, within a range that can be displayed by each projector, while arrowing an overlap can be considered as input images in embodiments of the present invention. An appropriate combining line of the images is determined in view of the appearance of the images. Furthermore, an image to be actually projected by each projector is then determined. At this time, the technique of embodiments of the present invention, i.e., the technique of determining a blend width between the projectors according to the combining line and the scene can be applied in the above-described manner.

The above description has been given assuming, as image data, digital colors and luminance information (RGB, etc.) that are obtained by cameras performing shooting. Nevertheless, if information recorded and held as image data contains information about a distance (depth) from a viewpoint that is associated with each pixel or region, embodiments of the present invention can be preferably applied by using the distance information as an image feature amount. In this case, the processing can be performed using the distance information in place of processing target pixel values described in each exemplary embodiment. More specifically, according to the first exemplary embodiment, a blend width is determined by reference to a match between the position of a combining line and edge components of the distance information. According to the second exemplary embodiment, a blend width is determined based on a difference between the respective average values of the distance information in the 2 small regions obtained by the division using the combining line.

In addition, in the above-described exemplary embodiments, a blend width is set according to a matching degree between the position and direction of a combining line and the position and direction of an edge. Information other than the matching degree may be used as long as the information indicates a correlation between the combining line and the edge. For example, the degree of difference between the position and direction of the combining line and the position and direction of the edge can be used. In this case, if there is a difference, a blend width is set to be large, and if there is no difference, a blend width I set to be small.

The present disclosure can also be implemented by executing the following processing. More specifically, the processing is processing of supplying software (program) for implementing functions of the above-described exemplary embodiments, to a system or an apparatus via a network or various types of storage media, and reading out and executing the program by a computer (or, a CPU, a micro processing unit (MPU), or the like) of the system or the apparatus.

According to the present disclosure, a plurality of images can be combined more naturally by weighted-adding pixel values in an overlap region according to an image feature.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171255, filed Aug. 31, 2015, and No. 2016-137644, filed Jul. 12, 2016, which are hereby incorporated by reference herein in their entirety.

What is claimed is:

1. An image processing apparatus for generating a panoramic image by combining a plurality of images in a partially-overlapping manner, comprising:
   one or more processors; and
   one or more memory storing instructions executable by the one or more processors, wherein the instructions, when executed by the one or more processors, cause the image processing apparatus to:
   acquire a position of a boundary line for combining a first image and a second image partially overlapping the first image in an overlap region, the first image and the second image being two of the plurality of images;
   detect an edge component of an object in vicinity of the position of the boundary line in either of the first image and second image;
   set a blend width of a region, in the overlap region and including the boundary line, where pixel values of pixels constituting the first image and pixel values of pixels constituting the second image are blended, wherein the blend width is set based on the position of the boundary line and the edge component; and
   combine the first image and the second image by blending the pixel values of the pixels constituting the first image and the pixel values of the pixels constituting the second image, in the region of the set blend width in the overlap region.

2. The image processing apparatus according to claim 1, wherein the instructions, when executed by the one or more processors, cause the image processing apparatus to:
   in a case in which the position of the boundary line and the edge component match each other, set the blend width of the region in which the first image and the second image are combined, to be smaller than in a case in which the position of the boundary line and the edge component do not match each other.

3. The image processing apparatus according to claim 1, wherein the instructions, when executed by the one or more processors, cause the image processing apparatus to:
   calculate, as a correlation, a matching degree between a position and a direction of the boundary line and a position and a direction of the edge component.

4. The image processing apparatus according to claim 1, wherein the instructions, when executed by the one or more processors, cause the image processing apparatus to:
   calculate an evaluation value for evaluating a matching degree between the position of the boundary line and the edge component, and set the blend width according to the evaluation value.

5. The image processing apparatus according to claim 1, wherein the instructions, when executed by the one or more processors, cause the image processing apparatus to:
   acquire a maximum blend width comprising an upper limit of the blend width, and
   set the blend width to the maximum blend width or smaller.

6. The image processing apparatus according to claim 5, wherein the maximum blend width is set based on an instruction issued by a user.

7. The image processing apparatus according to claim 1, wherein the instructions, when executed by the one or more processors, cause the image processing apparatus to:
   detect, as the edge component, a difference in characteristic between two partial regions obtained by division in a direction of the boundary line.

8. The image processing apparatus according to claim 7, wherein the instructions, when executed by the one or more processors, cause the image processing apparatus to:
   divide vicinity of the boundary line into blocks, and set, for each block, a blend width so as to narrow the blend width in a case in which a difference in characteristic between partial regions is large, and to widen the blend width in a case in which a difference in characteristic between partial regions is small.

9. The image processing apparatus according to claim 1, wherein the instructions, when executed by the one or more processors, cause the image processing apparatus to:
detect, as the edge component, an amount representing a degree of change in pixel value.

10. The image processing apparatus according to claim 1, wherein the instructions, when executed by the one or more processors, cause the image processing apparatus to:
detect a frequency characteristic as the edge component.

11. The image processing apparatus according to claim 1, wherein the image includes distance information representing a distance from a shooting viewpoint for each region represented by pixels, and
wherein the instructions, when executed by the one or more processors, cause the image processing apparatus to:
detect an edge in distance information related to a position and a direction of the boundary line in the first image and the second image.

12. An image processing method for generating a panoramic image by combining a plurality of images in a partially-overlapping manner, comprising:
acquiring a position of a boundary line for combining a first image and a second image partially overlapping the first image in an overlap region, the first image and the second image being two of the plurality of images;
detecting an edge component of an object in vicinity of the position of the boundary line in either of the first image and second image;
setting a blend width of a region, in the overlap region and including the boundary line, where pixel values of pixels constituting the first image and pixel values of pixels constituting the second image are blended, wherein the blend width is set based on the position of the boundary line and the edge component; and
combining the first image and the second image by blending the pixel values of the pixels constituting the first image and the pixel values of the pixels constituting the second image, in the region of the set blend width in the overlap region.

13. A non-transitory computer-readable storage medium storing a program for causing a computer to execute an image processing method for generating a panoramic image by combining a plurality of images in a partially-overlapping manner, the image processing method comprising:
acquiring a position of a boundary line for combining a first image and a second image partially overlapping the first image in an overlap region, the first image and the second image being two of the plurality of images;
detecting an edge component of an object in vicinity of the position of the boundary line in either of the first image and second image;
setting a blend width of a region, in the overlap region and including the boundary line, where pixel values of pixels constituting the first image and pixel values of pixels constituting the second image are blended, wherein the blend width is set based on the position of the boundary line and the edge component; and
combining the first image and the second image by blending the pixel values of the pixels constituting the first image and the pixel values of the pixels constituting the second image, in the region of the set blend width in the overlap region.

14. The image processing apparatus according to claim 1, wherein the instructions, when executed by the one or more processors, cause the image processing apparatus to:
acquire a boundary image indicating whether each pixel is a pixel positioned on the boundary line,
generate pre-blend image, which is the same size as the boundary image, by selecting any of the pixels in the first image and the second image, and generate an edge image indicating whether each pixel is an edge by detecting an edge in the pre-blend image as the feature amount, and
determine whether a block including the boundary line in the boundary image matches a block including the edge in the edge image, and set the blend width according to the result of determining.

15. The image processing apparatus according to claim 1, wherein the boundary line is a line in a direction orthogonal to a direction in which the first image and the second image about each other, and the blend width is a length in a direction in which the first image and the second image about each other.

16. The image processing apparatus according to claim 1, wherein the number of pixel pairs the pixel values of which are to be blended by the combining differs depending on the set blend width.

* * * * *